Patented Apr. 22, 1952

2,593,397

UNITED STATES PATENT OFFICE 2,593,397

PROCESS OF PRODUCING FILAMENTS

Willem Leendert Johannes de Nie, London, England, and Gottfried Ernst Rumscheidt, Amsterdam, Netherlands, assignors to Shell Development Company, San Francisco, Calif., a corporation of Delaware No Drawing. Application July 14, 1948, Serial No. 38,744. In the Netherlands July 17, 1947

7 Claims. (Cl. 18—54)

This invention relates to a process by which polyunsaturated high molecular weight materials, such as rubber and the like, are reacted with sulfur dioxide or other inorganic acidifying compounds to form useful products, the invention being specifically directed to the use of particular solvents for the respective reactants.

The term "high molecular weight, polyunsaturated compounds," as employed herein, embraces those compounds having a molecular weight of at least 5,000 which contain a plurality of unsaturated linkages in the molecule. These compounds are polymers which are either homopolymers of organic compounds containing a plurality of unsaturated linkages in the molecule, or are copolymers of such multiple-unsaturated compounds either with one another or with other unsaturated organic compounds. The term includes the various natural rubbers such as latex, crepe, sheet, Caoutchouc, gutta percha, balata, and cyclo rubbers, as well as unsaturated synthetic rubbers. Representative synthetic polymers of high molecular weight are the polymerization products of butadiene and those of its homologues and derivatives, as, for example, methyl butadiene polymers, dimethyl butadiene polymers, pentadiene polymers, and chloroprene polymers (neoprene synthetic rubber). Other high molecular weight polymers are those formed from acetylene hydrocarbons and their derivatives, as monovinyl acetylene polymer and divinyl acetylene polymer. Representative copolymers of high molecular weight which come within the term are those formed from butadiene, its homologues and derivatives, and from acetylene hydrocarbons and their derivatives, either in admixture (as the synthetic rubber Buna N, a copolymer of butadiene and acrylonitrile) or with other unsaturated organic compounds. Among the latter are the olefins, as isobutylene, which copolymerizes with butadiene to form butyl synthetic rubber; the vinyls, as vinyl chloride, acrylic acid, methacrylic acid, and styrene, the latter compound copolymerizing with butadiene to form the synthetic rubber Buna S; as well as the vinyl esters and various unsaturated aldehydes, ketones and ethers, as acrolein, methyl isopropenyl ketone, and vinyl ethyl ether.

The above-defined, polyunsaturated, high molecular weight materials may also properly be termed "high molecular weight polymers of diene hydrocarbons." Alternatively, these high molecular weight, polyunsaturated materials, including both natural as well as synthetic rubbers, may be defined as "rubbery polymers of at least one conjugated diolefin compound."

Among the polyunsaturated high molecular weight compounds, those which find preferred usage in the practice of this invention are the rubbers, by which term it is meant to include both the natural rubbers as well as those synthetic rubbers comprised in whole or part of butadiene polymers or copolymers.

As employed herein, the term "inorganic acidifying compound" embraces the various inorganic acids and acid anhydrides wherein the acid-forming element (as sulfur, nitrogen or phosphorus, for example), if possessing several valencies, is present in a valency other than the highest thereof. Suitable acidifying compounds are the acid anhydrides sulfur dioxide, phosphorus trioxide and nitrous trioxide, the acids formed in aqueous solution from these anhydrides, and such compounds as hydrogen sulfide, hydrochloric acid, hydrobromic acid, hydroiodic acid, and hydrofluoric acid. The term does not include such compounds as sulfur trioxide, phosphorus pentoxide, nitrogen pentoxide, or their corresponding acids, for in all these compounds the acid-forming element, which is here either sulfur, phosphorus or nitrogen, is present in the highest of several possible valencies. Of the various acidifying compounds set forth herein, the acid anhydrides sulfur dioxide, phosphorus trioxide and nitrous trioxide constitute a preferred group, though the compound most preferred is sulfur dioxide.

It is known that the high molecular weight polyunsaturated compounds lend themselves well to the production of various shapes, including those of a continuous, non-supported nature, as filaments, rods, strips, sheets, and the like. Processes of this nature are set forth in detail, for example, in U. S. Patents No. 2,185,656 issued January 2, 1940, No. 2,198,927 issued April 20, 1940, and No. 2,288,982 issued July 7, 1942, and reference is hereby made to the said patents for a more complete disclosure of the methods there described. Furthermore, it is known that the properties of such shapes may be improved by reacting the unsaturated, high molecular weight compound with one or more inorganic acidifying compounds, but particularly sulfur dioxide. The exact nature of the reaction between the unsaturated reactant and sulfur dioxide is not clearly understood, though it is evident that a quantity of the latter compound is taken up in one form or another by the high molecular weight reactant. The extent of the reaction is normally measured by, and expressed in terms of, the amount of sulfur present in the resulting reaction product. Whatever its nature, the reaction is an extremely slow one under normal conditions, and if materials of high purity be used, substantially no reaction at all occurs in most instances. This difficulty may be eliminated and the overall extent of reaction with sulfur dioxide or other acidifying reactant increased by treating the polyunsaturated, high molecular weight compound with an oxygen-yielding substance, and preferably a peroxide, whereby the unsaturated reactant becomes activated as regards the sulfur dioxide or other inorganic acidifying reactant employed. Processes of this nature are disclosed in copending applications Serial No. 760,924, filed July 14, 1947, now Patent Number 2,469,847, and Serial No. 788,312, filed November 26, 1947, now Patent Number 2,558,498, to which applications reference is here made for a complete description of the activation treatment.

From copending application, Serial No. 15,048, filed March 14, 1948, it is also known to react sulfur dioxide with mixtures containing a polyunsaturated, high molecular weight compound as well as an unsaturated compound of low molecular weight (below 5,000), it being disclosed in said application that improved dye acceptance and other beneficial qualities are achieved by utilizing both types of unsaturated reactants in forming the final reaction product. Representative low molecular weight compounds which are useful for this purpose are the various olefinic hydrocarbons, halides and esters such as 1,3-butadiene, allyl chloride, allyl acetate, and diallyl phthalate, for example. Many of the suitable low molecular weight unsaturated compounds are capable of ready polymerization and frequently are available only in the polymerized or partially polymerized condition. Accordingly, the term "low molecular weight unsaturated compounds" is also meant to include not only the unsaturated monomers, but also those unsaturated polymers and part polymers thereof whose molecular weight is less than 5,000. The peroxide activation treatment referred to above is also disclosed in copending application Serial No. 15,048 as said activation treatment relates to mixtures of high and low molecular weight unsaturated reactants.

In making filaments or other continuous shapes of such reaction products, the conventional practice is to spin or otherwise inject a solution of rubber or other polyunsaturated high molecular weight reactant into a coagulating bath in which the sulfur dioxide or equivalent acidifying compound is dissolved. Any peroxide and any low molecular weight unsaturated reactant employed are normally introduced into the rubber solution prior to its injection into the coagulating bath. The injected rubber or like material immediately reacts with the acidifying compound to form an insoluble reaction product whose shape conforms in section with that of the aperture through which injection or spinning took place, spinning being the term normally employed when considering the production of threads, fibers and similar filamentary shapes. The wet shapes recovered from the coagulating bath are then subjected to any desired after-treatment, as stretching or the like, following which they are carefully washed and dried.

As presently conducted, however, the foregoing method of operation involves a number of serious disadvantages. Firstly, due to the fact that the solvents heretofore employed for the polyunsaturated reactant have not been the same as those used to dissolve the acidifying compound, the composition of the reaction medium is constantly changed owing to the introduction of the solvent for the high molecular weight reactant into the coagulating bath. This change in composition adversely affects the uniformity of the resultant reaction products, and while such differences are not always immediately apparent, they soon show up in later spinning or other working operations involving the finished filaments or other shapes.

Another disadvantage of the present system for producing reaction products by injection of the high molecular weight reactant in solution form into the coagulating bath is that it intensifies the problem of solvent recovery from the liquid coagulating medium, for due to a lack of a satisfactory universal solvent for both reactants, the coagulating bath soon presents a liquid combination separable into its various components only with difficulty and with considerable added expense.

It is therefore an object of this invention to provide a method of forming reaction products of the type identified above whereby solutions of high molecular weight, polyunsaturated compounds may be introduced into coagulating baths containing the desired inorganic acidifying reactants without causing any appreciable change in the composition of the liquid medium comprising the solvent portion of the coagulating bath. Another object is to provide a method of producing reaction products of the foregoing variety which are characterized by a high degree of uniformity. Still another object is to provide a method of producing reaction products by injection of a solution of the high molecular weight compound into the coagulating bath wherein the problem of separating the various solvent components of the used coagulating liquid is substantially eliminated or at least greatly simplified. The nature of other objects as well will become clear from a consideration of the following description of the invention.

It is our discovery that the foregoing objects are achieved and other advantages realized as well by forming reaction products through injection of a solution of high molecular weight polyunsaturated compound in a cyclic hydrocarbon solvent into an inorganic acidifying compound-containing coagulating bath the solvent portion of which is a cyclic hydrocarbon solvent of substantially the same composition as that employed to dissolve the high molecular weight reactant. The term "cyclic hydrocarbon," as here employed is intended to include cycloalkanes such as cyclohexane, cyclopentane, methyl cyclohexane, methyl cyclopentane, 1,3-dimethyl cyclohexane, ethyl cyclohexane and decalin (decahydronaphthalene), for example, as well as aromatic hydrocarbons containing a phenyl or a condensed phenyl nucleus. Aromatic hydrocarbons comprise the preferred class of solvents for use in the present invention, and as representative members of this class there may be mentioned benzene, xylene, toluene, styrene, ethyl benzene, propyl benzene, butyl benzene, naphthalene, and tetralin (tetrahydronaphthalene). The cyclic hydrocarbons useful in the practice of the invention may also be referred to as "cyclic hydrocarbons the nuclear portion of which is free of aliphatic multiple bonds."

The foregoing cyclic hydrocarbon solvents offer the important advantages of being extremely well adapted to dissolve the various high molecular weight, polyunsaturated reactants, including both natural and synthetic rubbers, as well as those inorganic acidifying compounds, as sulfur dioxide, which form a part of the coagulating bath; at the same time, they are free of any solvent effect on the formed reaction products, thereby expediting precipitation of the same. Still another advantage of the aforementioned cyclic hydrocarbons is their strong resistance to conversion into the peroxide form even on long continued exposure to the atmosphere, this being true despite the fact that many of these solvents, as decalin, tetralin and ethyl benzene, for example, are converted into hydroperoxides under intensive aeration treatment. This is a decided advantage, for the final reaction products normally contain a residue of solvent even after the most careful washing treatments, and when such residual solvent takes the form of a compound capable of ready conversion to the peroxide form on exposure to the atmosphere (as is the case with dioxane and other ethers and ether-like compounds), deterioration of the product with age is unduly rapid, it being accelerated by the formed peroxide. It is here appropriate to remark that while peroxides normally form a part of the rubber or other solution of high molecular weight polyunsaturated reactant prior to its introduction into the coagulating bath, such peroxide is quickly destroyed by the acidic component of the bath, and particularly so when this component is sulfur dioxide.

By selecting the same cyclic hydrocarbon solvent or combination of solvents for both the high molecular weight, polyunsaturated reactant and the inorganic acidifying reactant, not only are the advantages outlined in the foregoing paragraph obtained, but the disadvantages heretofore encountered through use of different solvents for the respective reactants are eliminated. Thus, no longer does injection of the solution of high molecular weight reactant alter the composition of the coagulating bath, the solvent component of each being substantially the same, and as a result of this uniformity in the reaction medium the solid reaction products obtained will likewise have the evenness of quality which is essential for sound commercial operation. Obviously, too, any problem of separating the respective solvents in the coagulation liquid has also been eliminated, for now the one solvent serves in each of two solvent capacities while at the same time providing a medium in which the formed reaction products are highly insoluble.

The invention described herein may be practiced, for example, by dissolving a polyunsaturated high molecular weight compound, as a natural or synthetic rubber (butadiene polymer), in an appropriate solvent, as one made up of equal parts of benzene and toluene; this solution is then spun into a solution of sulfur dioxide in a solvent which in this case is also made up of equal parts of benezene and toluene. The injected polyunsaturated compound immediately reacts with the sulfur dioxide to form an insoluble reaction product which is continuously withdrawn from the bath. The injected rubber solution will preferably contain a small amount of a peroxide, as tetralinhydroperoxide, decalin-hydroperoxide, peracetic acid, perbenzoic acid, tertiary butyl hydroperoxide, hydrogen peroxide, persulfuric acid, percarbonic acid, or perboric acid, for example, and since such peroxides are normally available only in the form of relatively dilute solutions in the parent hydrocarbon, as tetralin, the conventional practice is to add the peroxide-containing solution to the solvent chosen, as benzene, toluene, or the like. Where the amount of peroxide-containing liquid (e. g., tetralin or decalin) so added assumes substantial proportions, the acid-containing coagulating bath may also be so compounded as to contain a proportional amount of such peroxide-parent compound. However, it is frequently the case that the parent hydrocarbon compound is of such character as itself to serve not only as a vehicle for the peroxides, but also as the solvent for the rubber or like polyunsaturated high molecular weight compound as well as the acidifying compound, this in either the presence or absence of another solvent. Thus, the benzene and/or toluene mentioned above may be eliminated and the rubber simply dissolved in a peroxide-containing cyclic hydrocarbon, as tetralin or decalin, in which case the coagulating bath is made up of this same (though peroxide-free) solvent, with sulfur dioxide dissolved therein.

While the essence of the present invention resides in the use of an appropriate cyclic hydrocarbon solvent of substantially the same composition for both the high molecular weight and the acidifying reactants, it is intended that other materials may be added to one or the other of the reacting solutions in minor amounts without departing from the spirit of the invention. Thus, low molecular weight unsaturated compounds, as butadiene, 1,5-hexadiene, allyl chloride and the like may be added to the solution of high molecular weight polyunsaturated reactant, and the same is true of various additives such as stabilizers, plasticizers, fillers, or substances which serve to reduce the combustibility of the solution. The solution of acid or acid anhydride, too, may contain minor amounts of other substances including stabilizers, combustion-reducing substances and materials such as water which serve to prevent clogging of the spinning nozzles by the forming reaction product. It has also proved beneficial in some instances to employ a lower aliphatic alcohol (e. g. methanol or ethanol) with the cyclic hydrocarbons or hydrocarbons in compounding the coagulating bath, the alcohol here serving to increase the solvent action of the coagulant liquid with respect to sulfur dioxide or an equivalent acidifying compound as well as expediting formation of the desired reaction product. In any event, however, both the rubber or like high molecular weight solution and the coagulating bath are made up in major portion (i. e. 51% or more by weight) of the same cyclic hydrocarbon solvent or mixture of such solvents.

The following examples illustrate the present invention in various of its embodiments:

*Example I*

First latex crepe natural rubber is masticated at a temperature of 60 C. and the resulting product (also termed plasticized or plastified rubber) is dissolved in toluene to form a 7.76% solution at 80° C. To this solution is then added a 6% solution of tetralin-hydroperoxide in tetralin, the amount of the latter solution added being sufficient to provide a concentration of approximately 15.4% tetralinhydroperoxide in the rubber solution, based on the weight of rubber present. The resulting solution, containing toluene 30.21 parts, tetralin 6.09 parts, tetralinhydroperoxide 0.39 part, and rubber 2.54 parts, is then extruded through spinnerets into a coagulating, or spinning bath made up in major portion of the toluene (29.48 parts), tetralin (6.06 parts), solvent of the rubber solution, but also containing dissolved sulfur dioxide (4.06 parts), water (0.21 part) and methanol (21.23 parts). The various parts and percentages expressed herein, unless otherwise indicated, are on a weight basis. The coagulation takes place at a temperature of −5° C.; after the extrusion, all the filaments from one spinneret are gathered to form a single thread which is stretched, washed thoroughly and dried. The dried filaments contain approximately 22.5% by weight sulfur.

*Example II*

A solution was prepared containing 6 kg. of plastified natural rubber in 94 kg. of a solvent made up of equal parts by volume of benzene and xylene, which solution also contained 900 grams of tetralinhydroperoxide. Threads were formed by spinning this solution at the rate of 4 cc. per minute through a spinning nozzle containing 20 holes, each with a diameter 0.09 mm., into a coagulating bath maintained at −5° C. which was made up of benzene and xylene in equal parts by volume and contained 100 grams of dissolved sulfur dioxide per liter. The bundle of threads emerging from the bath was wound on a reel via a thread check, after which the threads were washed with alcohol and dried in air. The sulfur content of the dried threads amounted to 20.7% by weight, the tensile strength was 190 grams/100 denier and their elongation at rupture was 14%.

*Example III*

The procedure outlined in the Example II above is repeated using butadiene polymer (molecular weight approximately 50,000) instead of natural rubber as the high molecular weight reactant, the other reaction conditions remaining the same. The nature and properties of the reaction product so obtained are substantially the same as those of the natural rubber threads described above.

*Example IV*

The procedure set forth in Example II is again repeated, but here using cyclohexane instead of a benzene-xylene mixture as the solvent for both the natural rubber and the sulfur dioxide. The product is indistinguishable from that obtained using the benzene-xylene solvent.

We claim as our invention:

1. In a process for producing filaments, the steps comprising spinning a solution of a hydroperoxide and a rubbery polymer of at least one conjugated diolefin compound in a cyclic hydrocarbon solvent the nuclear portion of which is free of aliphatic multiple bonds, into a coagulating bath comprising a solution of sulfur dioxide in a solvent made up in major portion of a cyclic hydrocarbon solvent having substantially the same composition as that employed to dissolve the hydroperoxide and rubbery polymer and containing a minor percentage of water, the rubbery polymer reacting with the sulfur dioxide in the bath to form an insoluble filamentary reaction product; and withdrawing the said filamentary product from the coagulating bath.

2. The process of claim 1 wherein the coagulating bath also contains a minor percentage of a lower aliphatic alcohol.

3. The process of claim 1 wherein the cyclic hydrocarbon solvent is made up of at least one aromatic hydrocarbon.

4. The process of claim 1 wherein the cyclic hydrocarbon solvent is made up of at least one cycloalkane hydrocarbon.

5. The process of claim 1 wherein there is added the further step of supplying sulfur dioxide to the coagulating bath to maintain the concentration thereof in the bath at a relatively constant level.

6. In a process for producing filaments, the steps comprising spinning a solution of natural rubber and a hydroperoxide in a solvent made up of benzene and xylene, into a coagulating bath comprising a solution of sulfur dioxide in a solvent made up in major portion of a benzene-xylene mixture having substantially the same composition as that employed to dissolve the rubber and hydroperoxide and containing a minor percentage of water, the rubber reacting with the sulfur dioxide in the coagulating bath to form an insoluble filamentary reaction product; and withdrawing the said filamentary product from the coagulating bath.

7. In a process for producing filaments, the steps comprising spinning a solution of natural rubber and tetralin hydroperoxide in a solvent made up of toluene and tetralin into a coagulating bath comprising a solution of sulfur dioxide in a solvent made up in major portion of a toluene-tetralin mixture of substantially the same composition as that employed to dissolve the rubber and tetralin hydroperoxide and containing a minor percentage of water, the rubber reacting with the sulfur dioxide in the bath to form an insoluble filamentary reaction product; and withdrawing the said filamentary product from the coagulating bath.

WILLEM LEENDERT JOHANNES DE NIE.
GOTTFRIED ERNST RUMSCHEIDT.

REFERENCES CITED

The following references are of record in the file of this patent:

UNITED STATES PATENTS

| Number | Name | Date |
|---|---|---|
| 1,925,879 | Oenslager | Sept. 5, 1933 |
| 2,265,722 | De Nie | Dec. 9, 1941 |
| 2,288,982 | Waterman | July 7, 1942 |
| 2,379,354 | Hilton | June 26, 1945 |
| 2,469,847 | De Nie et al. | May 10, 1949 |